(12) United States Patent
Horton

(10) Patent No.: US 12,639,661 B2
(45) Date of Patent: May 26, 2026

(54) USER-INITIATED END-OF-DELIVERY CONFIRMATION

(71) Applicant: Uber Technologies, Inc., San Francisco, CA (US)

(72) Inventor: Reed Sierra Horton, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 19/021,984

(22) Filed: Jan. 15, 2025

(65) Prior Publication Data

US 2025/0245618 A1      Jul. 31, 2025

Related U.S. Application Data

(60) Provisional application No. 63/626,758, filed on Jan. 30, 2024.

(51) Int. Cl.
*G06Q 10/0836* (2023.01)
*G06Q 10/0833* (2023.01)
(52) U.S. Cl.
CPC ..... *G06Q 10/0836* (2013.01); *G06Q 10/0833* (2013.01)
(58) Field of Classification Search
CPC .................... G06Q 10/0836; G06Q 10/08365
See application file for complete search history.

(56) References Cited

U.S. PATENT DOCUMENTS

| | | | | |
|---|---|---|---|---|
| 2019/0205819 A1* | 7/2019 | Igata | .................... | G06Q 10/083 |
| 2020/0218281 A1* | 7/2020 | Ono | .................... | G06Q 10/0833 |
| 2021/0398058 A1* | 12/2021 | Tartal | .................... | G06Q 10/083 |
| 2022/0083963 A1* | 3/2022 | Tanaka | .................... | G06Q 50/40 |
| 2023/0153720 A1* | 5/2023 | Medisetty | .............. | G06Q 10/02 |
| | | | | 705/7.25 |

OTHER PUBLICATIONS

Hoffmann et al., "On the Regulatory Framework for Last-Mile Delivery Robots," Published by mdpi.com, Aug. 1, 2018, Retrieved from https://www.mdpi.com/2075-1702/6/3/33 (Year: 2018).*

* cited by examiner

*Primary Examiner* — Daniel Vetter
*Assistant Examiner* — Bryan J Kirk
(74) *Attorney, Agent, or Firm* — Schwegman Lundberg & Woessner, P.A.

(57) ABSTRACT

A method for user-initiated end of delivery confirmation. A method and technique comprises causing display of a first interactive element on a user device in response to a vehicle carrying a payload approaching a destination; receiving a first user input comprising a first user interaction with the first interactive element; in response to receiving the first user input, causing a vehicle management component communicatively coupled to the vehicle to enable access to the payload in the vehicle and causing display of a second interactive element on the user device; receiving a second user input from the user device, the second user input comprising a second user interaction with the second interactive element; determining a retrieval status associated with the payload based on the second user interaction; and causing display of a confirmation on the user device based on retrieval status, the confirmation indicating that the payload has been retrieved.

18 Claims, 8 Drawing Sheets

600

602

VERIFY THE RETRIEVAL STATUS

604

RECEIVE A VEHICLE STATUS FROM THE VEHICLE MANAGEMENT COMPONENT

606

DETERMINE A READINESS OF THE VEHICLE BASED ON THE VEHICLE STATUS

608

OUTPUTTING THE READINESS

700

702

RECEIVE A SECOND USER INPUT

704

REPORT THE SECOND USER INPUT

706

REPORT A VEHICLE STATUS FROM THE VEHICLE MANAGEMENT COMPONENT, THE VEHICLE STATUS INDICATING THAT THE VEHICLE IS READY FOR A SUBSEQUENT TRANSPORTATION SERVICE

708

MATCH THE VEHICLE WITH THE SUBSEQUENT TRANSPORTATION SERVICE

USER-INITIATED END-OF-DELIVERY CONFIRMATION

CROSS-REFERENCE

This application is a non-provisional application claiming priority to a U.S. Provisional Patent Application Ser. No. 63/626,758, filed Jan. 30, 2024. The contents of this prior application are considered part of this application and are hereby incorporated by reference in its entirety.

BACKGROUND

An autonomous vehicle (AV) is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

BRIEF SUMMARY

A method for user-initiated end of delivery involves causing display of a first interactive element on a user device in response to a vehicle carrying a payload approaching a destination; receiving a first user input comprising a first user interaction with the first interactive element; in response to receiving the first user input, causing a vehicle management component communicatively coupled to the vehicle to enable access to the payload in the vehicle and causing display of a second interactive element on the user device; receiving a second user input from the user device, the second user input comprising a second user interaction with the second interactive element; determining a retrieval status associated with the payload based on the second user interaction; sending a signal to the vehicle management component in response to the second user interaction, the signal comprising the retrieval status; and causing display of a confirmation on the user device based on retrieval status, the confirmation indicating that the payload has been retrieved.

In some embodiments, a computing device that comprises a processor and a memory storing instructions that, when executed, configure the computing device to perform operations outlined in the method. In some embodiments, a non-transitory computer-readable storage medium, the non-transitory computer-readable storage medium including instructions that when executed by a computing device, cause the computing device to perform operations outlined in the method.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Examples described herein are directed to systems and methods for using a computing system to manage and/or operate one or more fleets of vehicles to execute transportation services, where the fleet or fleets include autonomous vehicles (AVs).

In an autonomous or semi-autonomous vehicle (collectively referred to as a vehicle or an AV), a vehicle autonomy system, sometimes referred to as an AV stack, controls braking, steering, or throttle of the vehicle. In a fully autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle. The autonomous vehicle may include any machine or robotic devices designed to traverse various environments while carrying payloads. An autonomous vehicle may be of various sizes and configurations.

In some examples, a service assignment system (e.g., service assignment system 102) receives requests for transportation services from one or more users. A transportation service may include transporting a payload, such as cargo and/or one or more passengers, from a service start location to a service end location (e.g., destination, drop-off location, final stop, arrival point). Examples of cargo can include food, packages, and/or the like. The service assignment system may match received transportation service requests from users with vehicles from the mixed fleet. When the service assignment system selects a vehicle for a requested transportation service, it may instruct the vehicle to begin executing the requested transportation service.

Figure 1:
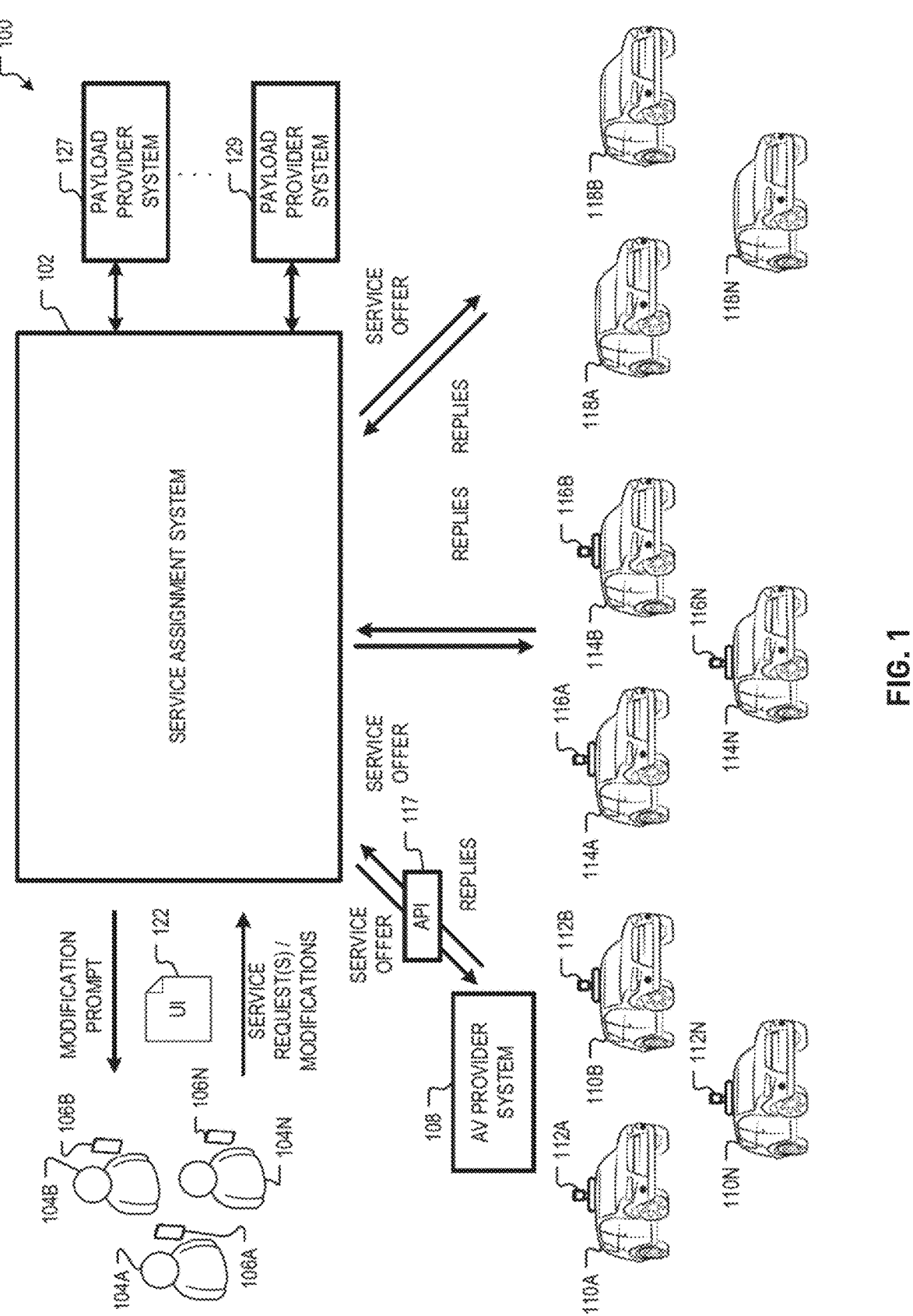
FIG. 1 is a diagram showing an environment for managing a mixed fleet of vehicles using a service assignment system, according to some examples.

FIG. 1 is a diagram showing one example of an environment 100 for managing a mixed fleet of vehicles using a service assignment system 102. The environment 100 includes the service assignment system 102, a fleet of vehicles 110A, 110B, 110N, 114A, 114B, 114N, 118A, 118B, 118N, and users 104A, 104B, 104N. The fleet of vehicles may be a mixed fleet including AVs and human-driven vehicles. In this example, the fleet includes AVs 110A, 110B, 110N, 114A, 114B, 114N and human-driven vehicles 118A, 118B, 118N. Some or all of the vehicles 110A, 110B, 110N, 114A, 114B, 114N, 118A, 118B, 118N may be passenger vehicles, such as passenger trucks, cars, buses, or other similar vehicles. Also, some or all of the vehicles 110A, 110B, 110N, 114A, 114B, 114N, 118A, 118B, 118N may be delivery vehicles, such as vans, delivery trucks, delivery robots, tractor trailers, etc.

Figure 2:
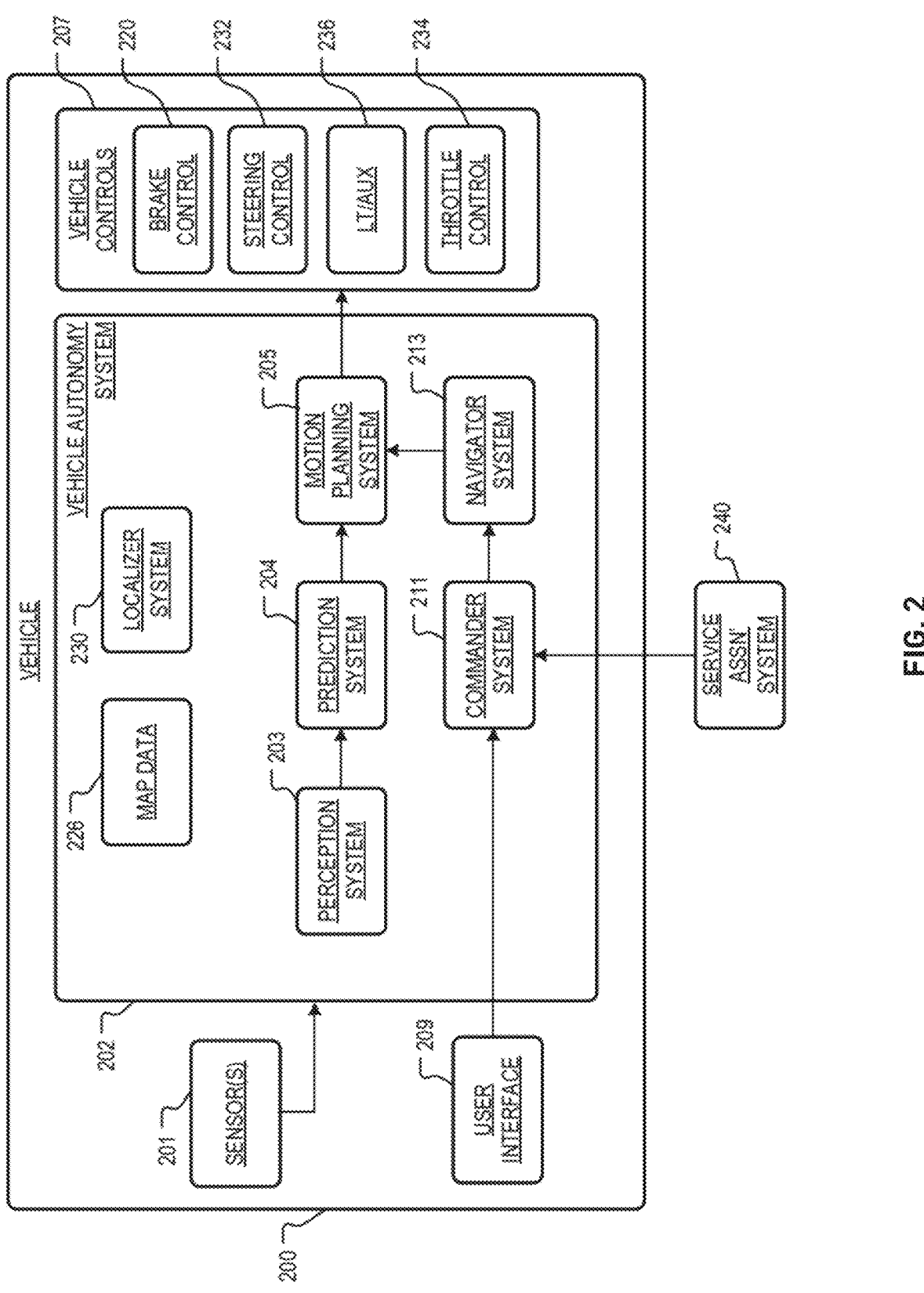
FIG. 2 is a block diagram of an example vehicle, according to some examples.

In this example, the AVs 110A, 110B, 110N, 114A, 114B, 114N include respective vehicle autonomy systems, described in more detail with respect to FIG. 2. The vehicle autonomy systems are configured to operate some or all of the controls of the AVs 110A, 110B, 110N, 114A, 114B, 114N (e.g., acceleration, braking, steering). In some examples, one or more of the AVs 110A, 110B, 110N, 114A, 114B, 114N are operable in different modes, where the vehicle autonomy system has differing levels of control over the AV 110A, 110B, 110N, 114A, 114B, 114N. Some AVs 110A, 110B, 110N, 114A, 114B, 114N may be operable in a fully autonomous mode in which the vehicle autonomy system has responsibility for all or most of the controls of the AV 110A, 110B, 110N, 114A, 114B, 114N. Some AVs 110A, 110B, 110N, 114A, 114B, 114N are operable in a semiautonomous mode that is in addition to or instead of the fully autonomous mode. In a semiautonomous mode, the vehicle autonomy system of an AV 110A, 110B, 110N, 114A, 114B, 114N is responsible for some of the vehicle controls while a human user or driver is responsible for other vehicle controls. In some examples, one or more of the AVs 110A, 110B, 110N, 114A, 114B, 114N are operable in a manual mode in which the human user is responsible for all controls of the AV 110A, 110B, 110N, 114A, 114B, 114N.

The AVs 110A, 110B, 110N, 114A, 114B, 114N include one or more respective remote-detection sensor sets 112A, 112B, 112N, 116A, 116B, 116N. The remote-detection sensor sets 112A, 112B, 112N, 116A, 116B, 116N include one or more remote-detection sensors that receive signals from the environment 100. The signals may be emitted by and/or reflected from objects in the environment 100, such as the ground, buildings, trees, etc. The remote-detection sensor sets 112A, 112B, 112N, 116A, 116B, 116N may include one or more active sensors, such as light imaging detection and ranging (LIDAR) sensors, radio detection and ranging (RADAR) sensors, and/or sound navigation and ranging (SONAR) sensors, that emit sound or electromagnetic radiation in the form of light or radio waves to generate return signals. Information about the environment 100 is extracted from the received signals. In some examples, the remote-detection sensor sets 112A, 112B, 112N, 116A, 116B, 116N include one or more passive sensors that receive signals that originated from other sources of sound or electromagnetic radiation. The remote-detection sensor sets 112A, 112B, 112N, 116A, 116B, 116N provide remote-detection sensor data that describes the environment 100. The AVs 110A, 110B, 110N, 114A, 114B, 114N can also include other types of sensors, for example, as described in more detail with respect to FIG. 2.

In some examples, the AVs 110A, 110B, 110N, 114A, 114B, 114N are of different types. Different types of AVs may have different capabilities. For example, the different types of AVs 110A, 110B, 110N, 114A, 114B, 114N can have different vehicle autonomy systems. This can include, for example, vehicle autonomy systems made by different manufacturers or designers, vehicle autonomy systems having different software versions or revisions, etc. Also, in some examples, the different types of AVs 110A, 110B, 110N, 114A, 114B, 114N can have different remote-detection sensor sets 112A, 112B, 112N, 116A, 116B, 116N. For example, one type of AV 110A, 110B, 110N, 114A, 114B, 114N may include a LIDAR remote-detection sensor, while another type may include stereoscopic cameras and omit a LIDAR remote-detection sensor. In some examples, different types of AVs 110A, 110B, 110N, 114A, 114B, 114N can also have different mechanical particulars. For example, one type of vehicle may have all-wheel drive, while another type may have front-wheel drive, etc.

In the example of FIG. 1, the AVs 110A, 110B, 110N are managed by an AV provider system 108. The AV provider system 108 may be implemented by an entity that manages or otherwise operates the AVs 110A, 110B, 110N. For example, service offers offering a transportation service to the AVs 110A, 110B, 110N may be directed from the service assignment system 102 to the AV provider system 108. The AV provider system 108 may communicate the service offers to the respective AVs 110A, 110B, 110N. Replies to service offers (e.g., messages accepting and/or declining an offered transportation service) may be sent from the AV provider system 108 to the service assignment system 102. In some examples, the AV provider system 108 may accept and/or decline a service offer on behalf of one or more of the AVs 110A, 110B, 110N. Also, in some examples, the service assignment system 102 may direct a service offer to the AV provider system 108 instead of directly to one or more of the AVs 110A, 110B, 110N. The AV provider system 108 may select and AV 110A, 110B, 110N to perform the offered transportation service. Although one AV provider system 108 and associated AVs 110A, 110B, 110N are shown in FIG. 1, it will be appreciated that other examples of the environment may include multiple AV provider systems and associated AVs. In some examples, the AV provider system 108 manages or operates the AVs via one or more vehicle management components 502. The vehicle management component 502 is described in more details with reference to FIG. 5.

In some examples, communication between the service assignment system 102 and one or more AV provider systems 108 is performed by an application programming interface (API) such as API 117. For example, service offers from the service assignment system 102 to the AV provider system 108 or directly to one or more of the AVs 110A, 110B, 110N using one or more calls by the service assignment system 102 and/or by the AV provider system 108 to the API 117. Similarly, replies from the AV provider system 108 to the service assignment system 102 may involve one or more calls to the API 117 by the AV provider system 108 or the service assignment system 102. For example, the AV provider system 108 may reply to a service offers by accepting the offer or declining the offer. Also, although a single API 117 is shown in FIG. 1, it will be appreciated that some arrangements may include multiple APIs for managing communications between the AV provider system 108 and the service assignment system 102. For example, different APIs may be used for different communication tasks.

In some examples, the service assignment system 102 may communicate directly with AVs 114A, 114B, 114N (e.g., not through an AV provider system 108). For example, the service assignment system 102 may provide service offers and receive replies directly to AVs 114A, 114B, 114N. The AVs 114A, 114B, 114N with which the service assignment system 102 communicates directly may be operated and/or managed by a third-party AV provider and/or by the entity implementing the service assignment system 102.

In the example of FIG. 1, the service assignment system 102 also communicates with human-driven vehicles 118A, 118B, 118N, for example, to provide service offers and receive replies. The service assignment system 102 may communicate with the vehicles 118A, 118B, 118N themselves (e.g., through an infotainment system or other suitable computing system of the vehicle) and/or with one or more of the human drivers of the vehicles 118A, 118B, 118N (e.g., via a user computing device or devices of the human drivers). It will be appreciated that FIG. 1 shows just one example of a mixed fleet and that different mixed fleets may have different numbers and proportions of AVs and human-driven vehicles.

The service assignment system 102 is programmed to receive service requests from the users 104A, 104B, 104N and offer requested transportation services to vehicles selected from the fleet of vehicles 110A, 110B, 110N, 114A, 114B, 114N, 118A, 118B, 118N as described herein. The service assignment system 102 can be or include one or more servers or other suitable computing devices. The service assignment system 102 is configured to receive transportation service requests from one or more users 104A, 104B, 104N. The users 104A, 104B, 104N make transportation service requests with user computing devices 106 (e.g., user computing device 106A, 106B, 106N.) The user computing devices 106A, 106B, 106N can be or include any suitable computing device such as, for example, tablet computers, mobile telephone devices, laptop computers, desktop computers, etc. In some examples, the user computing devices 106A, 106B, 106N execute an application associated with a transportation service implemented with the service assignment system 102. The users 104A, 104B, 104N launch the application on the respective user computing devices 106A, 106B, 106N and utilize functionality of the application to make transportation service requests. A user computing device 106 may be referred to as a user device.

The service assignment system 102 is programmed to receive and process transportation service requests from users 104A, 104B, 104N. Upon receiving a transportation service request, the service assignment system 102 may filter the fleet of vehicles 110A, 110B, 110N, 114A, 114B, 114N, 118A, 118B, 118N to select a set of one or more candidate vehicles. The candidate vehicles may include vehicles that are suitable, or potentially suitable, for executing the requested transportation service. From the set of candidate vehicles, the service assignment system 102 may select a vehicle or vehicles to which the requested transportation service will be offered. The service assignment system 102 may select the vehicle or vehicles based on any suitable criterion or criteria such as, for example, vehicle status, vehicle locations, vehicle cost to execute the requested transportation service, a prior acceptance rate of the vehicle and/or of vehicles of the same time, etc. In some examples, the service assignment system 102 selects a vehicle or vehicles to offer a transportation service using a route for the transportation service, which may be generated by the service assignment system 102, by the AV provider system 108, and/or by any other suitable component of the environment 100.

The service assignment system 102 may select the candidate vehicles based on various criteria such as, for example, the availability of the various vehicles in the fleet, properties of the service request, user preferences, vehicle status, and/or the like. Properties of the service request may include, for example, the service start location, the service end location, the type of payload (e.g., size and weight of payload, number of passengers, etc.).

In some examples, the service assignment system 102 may offer a transportation service to an AV provider system 108. For example, the service assignment system 102 may query the AV provider system 108 to receive a description of parameters describing how one or more of the AVs 110A, 110B, 110N managed by the AV provider system 108 could perform a route requested transportation service. The parameters provided by the AV provider system 108 may include, for example, the availability of one or more of the AVs 110A, 110B, 110N (e.g., vehicle status), properties of the service request, user preferences, and/or the like.

If the parameters provided by the AV provider system 108 are acceptable, the service assignment system 102 may offer the transportation service to the AV provider system 108. The AV provider system 108 may distribute the requested transportation service for execution by one or more of the AVs 110A, 110B, 110N managed by the AV provider system 108.

In some examples, the service assignment system 102 provides a user interface (UI) 122 to the users 104A, 104B, 104N via the respective user computing devices 106A, 106B, 106N. The UI 122 may provide functionality allowing the users to make service requests for transportation services. For example, the UI 122 may include fields in which a user 104A, 104B, 104N can provide request properties such as, for example, a service start location, a service end location, a description of the desired payload, and/or the like.

In some examples, a user 104A, 104B, 104N may request a transportation service that involves the delivery of a product, where the product is all or part of the payload of the transportation service. For example, a user 104A, 104B, 104N may request delivery of a meal from a restaurant or other provider, a delivery of a purchase from a store or other provider. In some examples, the service assignment system 102 is in communication with one or more payload provider systems 127, 129. Payload provider systems 127, 129 are associated with restaurants, stores, or other entities that provide payloads for transportation services, for example, where the payloads are delivered to the service end location.

In some examples, the UI 122 includes information about payload that can be provided by a payload provider system 127, 129. Consider an example in which a transportation service is to deliver prepared food via a payload provider system 127, 129. The UI 122 may include fields allowing the user 104A, 104B to select the payload provider system 127, 129 and/or items from the menu of the payload provider system 127, 129 for delivery. The properties of the service request, then, can include the identified payload. When a vehicle and/or AV provider system 108 accepts the requested transportation service, the service assignment system 102 may provide an instruction to the selected payload provider system 127, 129 requesting preparation of the payload and providing information about the vehicle that will pick up the payload for delivery.

The example environment 100 describes a mixed fleet including AVs 110A, 110B, 110N managed by the AV provider system 108, AVs managed by the service assignment system 102 and human-driven vehicles 118A, 118B, 118N. It will be appreciated, however, that in various examples, the environment 100 may include more or fewer different types of vehicles. For example, in some arrangements, the service assignment system 102 may offer transportation services to multiple third-party fleets of autonomous vehicles via multiple AV provider systems (e.g., and multiple APIs or API instances). In other examples, some or all of the vehicle types shown in the environment 100 be omitted. For example, the service assignment system 102 may be configured to offer service assignments only to autonomous vehicles or only to autonomous vehicles managed by AV provider systems, or permutations thereof.

In some examples, the service assignment system 102 may arrange transportation services by matching a user 104A, 104B, 104N with an AV 110A, 110B, 110N of the third-party AV provider (e.g., managed by the AV provider system 108). For example, the service assignment system 102 may receive a transportation service request a user 104A, 104B, 104N. The service assignment system 102 may match the requested transportation service to an AV 110A, 110B, 110N managed by the AV provider system 108. For example, the selected AV 110A, 110B, 110N may be an AV that is positioned near the requested pickup position of the user 104A, 104B, 104N.

In some examples, the environment 100 may be arranged to support user-initiated end-of-service for transportation services through the AV provider system 108. For example, at the conclusion of a transportation service performed by one of the AVs 110A, 110B, 110N, a user 104A, 104B, 104N may be provided with a selectable button or other selectable UI element via the UI 122. At the conclusion of a transportation service, when the user 104A, 104B, 104N has exited the vehicle and/or removed other payload from the AV 110A, 110B, 110N, the user 104A, 104B, 104N may select the selectable button or other selectable UI element via the UI 122. This may cause the user device 106A, 106B, 106N to send an end-of-service message to the service assignment system 102. The service assignment system 102 may, in some examples, forward the end-of-service message to the AV provider system 108. This may indicate to the AV provider system 108 that the AV 110A, 110B, 110N can begin another transportation service or other activity. In some examples, the AV provider system 108 may respond to the end-of-service message by providing a confirmation message to the service assignment system 102. The confirmation message may confirm that the transportation service is complete.

In some examples, a user-initiated end-of-service message, as described herein, may serve to indicate to the AV 110A, 110B, 110N and/or the AV provider system 108 that the AV has completed a transportation service and is available to accept another transportation service or to perform another activity. The user-initiated end-of-service message, in some examples, may also indicate to the user 104A, 104B, 104N that the transportation service is complete and that the user may leave the physical vicinity of the AV 110A, 110B, 110N. For example, some users 104A, 104B, 104N may not know when to leave an AV 110A, 110B, 110N after exiting the AV 110A, 110B, 110N and/or removing payload from the AV 110A, 110B, 110N. Providing the user 104A, 104B, 104N with the opportunity to send an end-of-service message may also provide the user with an indication that it is acceptable for the user to leave the AV 110A, 110B, 110N.

FIG. 2 depicts a block diagram of an example vehicle 200 according to example aspects of the present disclosure. The vehicle 200 shows one example arrangement of the AVs 110A, 110B, 110N, 114A, 114B, 114N of FIG. 1. The vehicle 200 includes one or more sensors 201, a vehicle autonomy system 202, and one or more vehicle controls 207. The vehicle 200 is an autonomous vehicle, as described herein. The example vehicle 200 shows just one example arrangement of an autonomous vehicle. In some examples, autonomous vehicles of different types can have different arrangements. In some examples, the vehicle 200 may include a vehicle management component 502. The vehicle management component 502 is described with reference to FIG. 5.

The vehicle autonomy system 202 includes a commander system 211, a navigator system 213, a perception system 203, a prediction system 204, a motion planning system 205, and a localizer system 230 that cooperate to perceive the surrounding environment of the vehicle 200 and determine a motion plan for controlling the motion of the vehicle 200 accordingly.

The vehicle autonomy system 202 is engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generates an appropriate route through the environment. The vehicle autonomy system 202 sends commands to control the one or more vehicle controls 207 to operate the vehicle 200 according to the route.

Various portions of the vehicle autonomy system 202 receive sensor data from the one or more sensors 201. For example, the sensors 201 may include remote-detection sensors as well as motion sensors such as an inertial measurement unit (IMU), one or more encoders, or one or more odometers. The sensor data includes information that describes the location of objects within the surrounding environment of the vehicle 200, information that describes the motion of the vehicle 200, etc.

The sensors 201 may also include one or more remote-detection sensors or sensor systems, such as a LIDAR system, a RADAR system, one or more cameras, etc. As one example, a LIDAR system of the one or more sensors 201 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 201 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 201 may generate sensor data (e.g., remote-detection sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 201 can include a positioning system. The positioning system determines a current position of the vehicle 200. The positioning system can be any device or circuitry for analyzing the position of the vehicle 200. For example, the positioning system can determine a position by using one or more of inertial sensors, a satellite positioning system such as the Global Positioning System (GPS), a positioning system based on IP address, triangulation and/or proximity to network access points or other network components (e.g., cellular towers, Wi-Fi access points), and/or other suitable techniques. The position of the vehicle 200 can be used by various systems of the vehicle autonomy system 202.

Thus, the one or more sensors 201 are used to collect sensor data that includes information that describes the location (e.g., in three-dimensional space relative to the vehicle 200) of points that correspond to objects within the surrounding environment of the vehicle 200. In some implementations, the sensors 201 can be positioned at different locations on the vehicle 200. As an example, in some implementations, one or more cameras and/or LIDAR sensors can be located in a pod or other structure that is mounted on a roof of the vehicle 200, while one or more RADAR sensors can be located in or behind the front and/or rear bumper(s) or body panel(s) of the vehicle 200. As another example, one or more cameras can be located at the front or rear bumper(s) of the vehicle 200. Other locations can be used as well.

The localizer system 230 receives some or all of the sensor data from the sensors 201 and generates vehicle poses for the vehicle 200. A vehicle pose describes a position and attitude of the vehicle 200. The vehicle pose (or portions thereof) can be used by various other components of the vehicle autonomy system 202 including, for example, the perception system 203, the prediction system 204, the motion planning system 205, and the navigator system 213.

The position of the vehicle 200 is a point in a three-dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis, and a roll about a second horizontal axis. In some examples, the localizer system 230 generates vehicle poses periodically (e.g., every second, every half second). The localizer system 230 appends time stamps to vehicle poses, where the time stamp for a pose indicates the point in time that is described by the pose. The localizer system 230 generates vehicle poses by comparing sensor data (e.g., remote-detection sensor data) to map data 226 describing the surrounding environment of the vehicle 200.

In some examples, the localizer system 230 includes one or more pose estimators and a pose filter. Pose estimators generate pose estimates by comparing remote-detection sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 230 generates vehicle poses. Accordingly, the pose filter generates some vehicle poses by extrapolating from a previous pose estimate utilizing motion sensor data.

Vehicle poses and/or vehicle positions generated by the localizer system 230 are provided to various other components of the vehicle autonomy system 202. For example, the commander system 211 may utilize a vehicle position to determine whether to respond to a call from a service assignment system 240.

The commander system 211 determines a set of one or more target locations that are used for routing the vehicle 200. The target locations are determined based on user input received via a user interface 209 of the vehicle 200. The user interface 209 may include and/or use any suitable input/output device or devices. In some examples, the commander system 211 determines the one or more target locations considering data received from the service assignment system 240. The service assignment system 240 is programmed to provide instructions to multiple vehicles, for example, as part of a fleet of vehicles for moving passengers and/or cargo. Data from the service assignment system 240 can be provided via a wireless network, for example.

The navigator system 213 receives one or more target locations from the commander system 211 and map data 226. The map data 226, for example, provides detailed information about the surrounding environment of the vehicle 200. The map data 226 provides information regarding identity and location of different roadways and roadway elements. A roadway is a place where the vehicle 200 can drive and may include, for example, a road, a street, a highway, a lane, a parking lot, or a driveway. Routing graph data is a type of map data 226.

From the one or more target locations and the map data 226, the navigator system 213 generates route data describing a route for the vehicle 200 to take to arrive at the one or more target locations. In some implementations, the navigator system 213 determines route data using one or more path-planning algorithms based on costs for graph elements/corresponding roadway elements, as described herein. For example, a cost for a route can indicate a time of travel, risk of danger, or other factor associated with adhering to a particular proposed route. Route data describing a route is provided to the motion planning system 205, which commands the vehicle controls 207 to implement the route or route extension, as described herein. The navigator system 213 can generate routes as described herein using a general-purpose routing graph and routing graph modification data. Also, in examples where route data is received from the service assignment system 240, that route data can also be provided to the motion planning system 205.

The perception system 203 detects objects in the surrounding environment of the vehicle 200 based on sensor 201 data, the map data 226, and/or vehicle poses provided by the localizer system 230. For example, the map data 226 used by the perception system 203 describes roadways and segments thereof and may also describe buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 202 in comprehending and perceiving its surrounding environment and its relationship thereto.

In some examples, the perception system 203 determines state data for one or more of the objects in the surrounding environment of the vehicle 200. State data describes a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron);

type/class (e.g., vehicle, pedestrian, bicycle, or other); yaw rate; distance from the vehicle 200; minimum path to interaction with the vehicle 200; minimum time duration to interaction with the vehicle 200; and/or other state information.

In some implementations, the perception system 203 determines state data for each object over a number of iterations. In particular, the perception system 203 updates the state data for each object at each iteration. Thus, the perception system 203 detects and tracks objects, such as other vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 generates prediction data associated with one or more of the objects detected by the perception system 203. In some examples, the prediction system 204 generates prediction data describing each of the respective objects detected by the perception system 203.

Prediction data for an object is indicative of one or more predicted future locations of the object. For example, the prediction system 204 may predict where the object will be located within the next 5 seconds, 30 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the localizer system 230 and/or map data 226.

In some examples, the prediction system 204 uses state data indicative of an object type or classification to predict a trajectory for the object. As an example, the prediction system 204 can use state data provided by the perception system 203 to determine that a particular object (e.g., an object classified as a vehicle) approaching an intersection and maneuvering into a left-turn lane intends to turn left. In such a situation, the prediction system 204 predicts a trajectory (e.g., path) corresponding to a left turn for the vehicle such that the vehicle turns left at the intersection. Similarly, the prediction system 204 determines predicted trajectories for other objects, such as bicycles, pedestrians, parked vehicles, etc. The prediction system 204 provides the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object, and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 commands the vehicle controls 207 based at least in part on the predicted trajectories associated with the objects within the surrounding environment of the vehicle 200, the state data for the objects provided by the perception system 203, vehicle poses provided by the localizer system 230, the map data 226, and route or route extension data provided by the navigator system 213. Stated differently, given information about the current locations of objects and/or predicted trajectories of objects within the surrounding environment of the vehicle 200, the motion planning system 205 determines control commands for the vehicle 200 that best navigate the vehicle 200 along the route or route extension relative to the objects at such locations and their predicted trajectories on acceptable roadways.

In some implementations, the motion planning system 205 can also evaluate one or more cost functions and/or one or more reward functions for each of one or more candidate control commands or sets of control commands for the vehicle 200. Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate control command or set of control commands. The motion planning system 205 can select or determine a control command or set of control commands for the vehicle 200 based at least in part on the cost function(s) and the reward function(s). For example, the motion plan that minimizes the total cost can be selected or otherwise determined.

In some implementations, the motion planning system 205 can be configured to iteratively update the route or route extension for the vehicle 200 as new sensor data is obtained from the one or more sensors 201. For example, as new sensor data is obtained from the one or more sensors 201, the sensor data can be analyzed by the perception system 203, the prediction system 204, and the motion planning system 205 to determine the motion plan.

The motion planning system 205 can provide control commands to the one or more vehicle controls 207. For example, the one or more vehicle controls 207 can include throttle systems, brake systems, steering systems, and other control systems, each of which can include various vehicle controls (e.g., actuators or other devices that control gas flow, steering, and braking) to control the motion of the vehicle 200. The various vehicle controls 207 can include one or more controllers, control devices, motors, and/or processors. In some examples, the one or more vehicle controls 207 include one or more actuators for opening or closing a storage space (e.g., compartment, trunk, frunk, box), a window, a port (e.g., charging port), a sun roof, or other hardware components of the vehicle.

The vehicle controls 207 include a brake control module 220. The brake control module 220 is configured to receive a braking command and bring about a response by applying (or not applying) the vehicle brakes. In some examples, the brake control module 220 includes a primary system and a secondary system. The primary system receives braking commands and, in response, brakes the vehicle 200. The secondary system may be configured to determine a failure of the primary system to brake the vehicle 200 in response to receiving the braking command.

A steering control system 232 is configured to receive a steering command and bring about a response in the steering mechanism of the vehicle 200. The steering command is provided to a steering system to provide a steering input to steer the vehicle 200.

A lighting/auxiliary control module 236 receives a lighting or auxiliary command. In response, the lighting/auxiliary control module 236 controls a lighting and/or auxiliary system of the vehicle 200. Controlling a lighting system may include, for example, turning on, turning off, or otherwise modulating headlights, parking lights, running lights, etc. Controlling an auxiliary system may include, for example, modulating windshield wipers, a defroster, etc.

A throttle control system 234 is configured to receive a throttle command and bring about a response in the engine speed or other throttle mechanism of the vehicle. For example, the throttle control system 234 can instruct an engine and/or engine controller, or other propulsion system component, to control the engine or other propulsion system of the vehicle 200 to accelerate, decelerate, or remain at its current speed.

Each of the perception system 203, the prediction system 204, the motion planning system 205, the commander system 211, the navigator system 213, and the localizer system 230 can be included in or otherwise be a part of the vehicle autonomy system 202 configured to control the vehicle 200 based at least in part on data obtained from the one or more sensors 201. For example, data obtained by the one or more sensors 201 can be analyzed by each of the perception system 203, the prediction system 204, and the motion planning system 205 in a consecutive fashion in order to control the vehicle 200. While FIG. 2 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 202 includes one or more computing devices, which may implement all or parts of the perception system 203, the prediction system 204, the motion planning system 205, and/or the localizer system 230. Descriptions of hardware and software configurations for computing devices to implement the vehicle autonomy system 202 and/or the service assignment system 102 of FIG. 1 are provided herein with reference to FIGS. 3 and 4.

Figure 3:
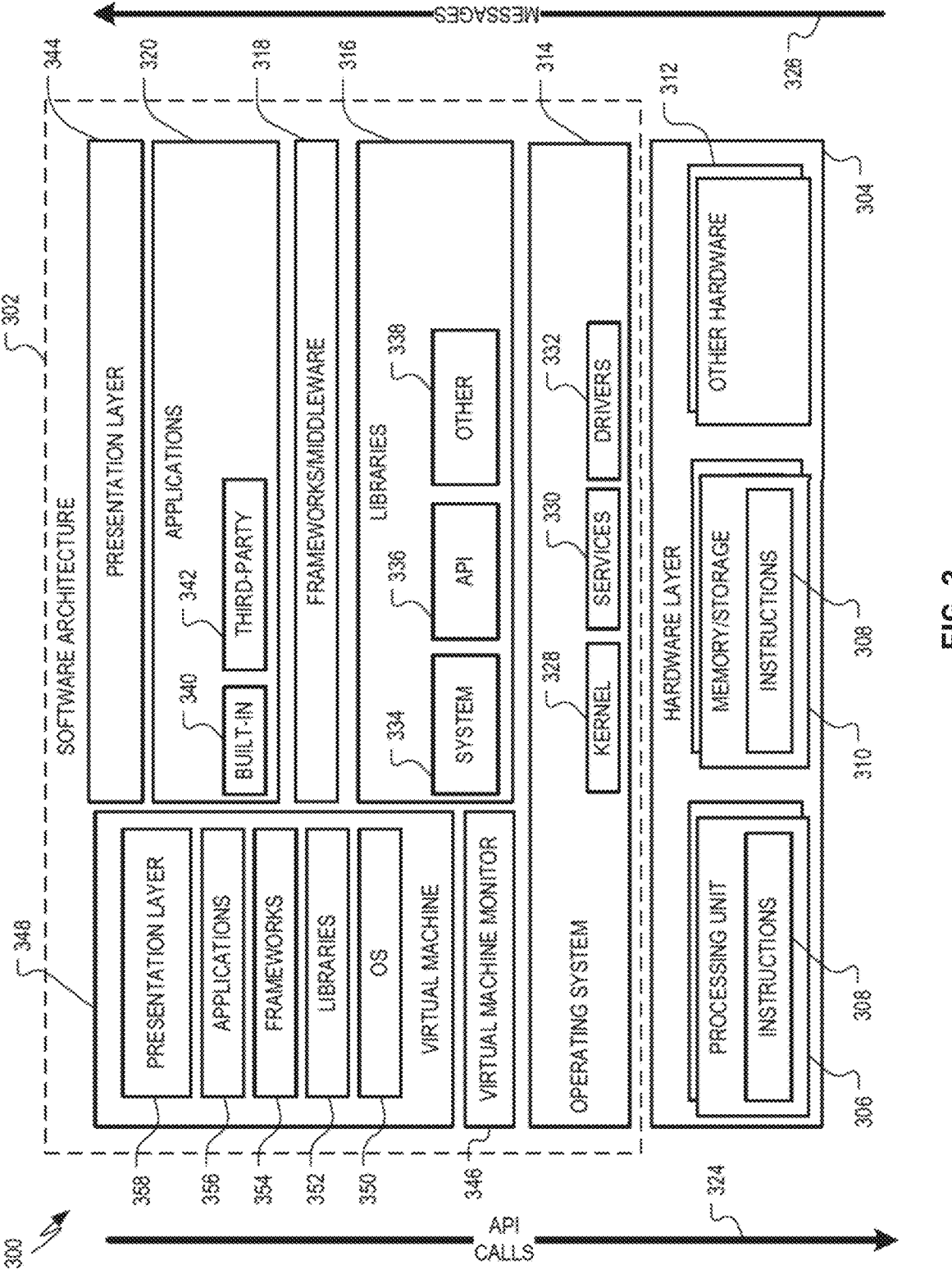
FIG. 3 is a block diagram showing a software architecture for a computing device, according to some examples.

FIG. 3 is a block diagram 300 showing one example of a software architecture 302 for a computing device. The software architecture 302 may be used in conjunction with various hardware architectures, for example, as described herein. FIG. 3 is merely a non-limiting example of a software architecture 302 that may be used to implement one or more of the computing systems described herein including, for example, the vehicle autonomy systems of the various AVs 110A, 110B, 110N, 114A, 114B, 114N. It will be appreciated that this, and/or many other suitable architectures may be implemented to facilitate the functionality described herein.

A representative hardware layer 304 is illustrated and can represent, for example, any of the above-referenced computing devices. In some examples, the hardware layer 304 may be implemented according to a hardware architecture, such as the hardware architecture 400 of FIG. 4 and/or the software architecture 302 of FIG. 3.

The representative hardware layer 304 comprises one or more processing units 306 having associated executable instructions 308. The executable instructions 308 represent the executable instructions of the software architecture 302, including implementation of the methods, modules, components, and so forth of FIGS. 1-7. The hardware layer 304 also includes memory and/or storage modules 310, which also have the executable instructions 308. The hardware layer 304 may also comprise other hardware 312, which represents any other hardware of the hardware layer 304, such as the other hardware illustrated as part of the hardware architecture 400.

In the example architecture of FIG. 3, the software architecture 302 may be conceptualized as a stack of layers where each layer provides particular functionality. For example, the software architecture 302 may include layers such as an operating system 314, libraries 316, middleware layer 318, applications 320, and a presentation layer 344. Operationally, the applications 320 and/or other components within the layers may invoke application programming interface (API) calls 324 through the software stack and receive a response, returned values, and so forth illustrated as messages 326 in response to the API calls 324. The layers illustrated are representative in nature, and not all software architectures have all layers. For example, some mobile or special-purpose operating systems may not provide a middleware layer 318, while others may provide such a layer. Other software architectures may include additional or different layers.

The operating system 314 may manage hardware resources and provide common services. The operating system 314 may include, for example, a kernel 328, services 330, and drivers 332. The kernel 328 may act as an abstraction layer between the hardware and the other software layers. For example, the kernel 328 may be responsible for memory management, processor management (e.g., scheduling), component management, networking, security settings, and so on. The services 330 may provide other common services for the other software layers. In some examples, the services 330 include an interrupt service. The interrupt service may detect the receipt of a hardware or software interrupt and, in response, cause the software architecture 302 to pause its current processing and execute an interrupt service routine (ISR) when an interrupt is received. The ISR may generate an alert.

The drivers 332 may be responsible for controlling or interfacing with the underlying hardware. For instance, the drivers 332 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 316 may provide a common infrastructure that may be used by the applications 320 and/or other components and/or layers. The libraries 316 typically provide functionality that allows other software modules to perform tasks in an easier fashion than by interfacing directly with the underlying operating system 314 functionality (e.g., kernel 328, services 330, and/or drivers 332). The libraries 316 may include system libraries 334 (e.g., C standard library) that may provide functions such as memory allocation functions, string manipulation functions, mathematic functions, and the like. In addition, the libraries 316 may include API libraries 336 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 316 may also include a wide variety of other libraries 338 to provide many other APIs to the applications 320 and other software components/modules.

The middleware layer 318 (also sometimes referred to as frameworks) may provide a higher-level common infrastructure that may be used by the applications 320 and/or other software components/modules. For example, the middleware layer 318 may provide various graphical user interface (GUI) functions, high-level resource management, high-level location services, and so forth. The middleware layer 318 may provide a broad spectrum of other APIs that may be used by the applications 320 and/or other software components/modules, some of which may be specific to a particular operating system or platform.

The applications 320 include built-in applications 340 and/or third-party applications 342. Examples of representative built-in applications 340 may include, but are not limited to, a contacts application, a browser application, a book reader application, a location application, a media application, a messaging application, and/or a game application. The third-party applications 342 may include any of the built-in applications 340 as well as a broad assortment of other applications. In a specific example, the third-party application 342 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 342 may invoke the API calls 324 provided by the mobile operating system such as the operating system 314 to facilitate functionality described herein.

The applications 320 may use built-in operating system functions (e.g., kernel 328, services 330, and/or drivers 332), libraries (e.g., system libraries 334, API libraries 336, and other libraries 338), or middleware layer 318 to create user interfaces to interact with users of the system. Alternatively, or additionally, in some systems, interactions with a user may occur through a presentation layer, such as the presentation layer 344. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 3, this is illustrated by a virtual machine 348. A virtual machine creates a software environment where applications/modules can execute as if they were executing on a hardware computing device. The virtual machine 348 is hosted by a host operating system (e.g., the operating system 314) and typically, although not always, has a virtual machine monitor 346, which manages the operation of the virtual machine 348 as well as the interface with the host operating system (e.g., the operating system 314). A software architecture executes within the virtual machine 348, such as an operating system 350, libraries 352, frameworks/middleware 354, applications 356, and/or a presentation layer 358. These layers of software architecture executing within the virtual machine 348 can be the same as corresponding layers previously described or may be different.

Figure 4:
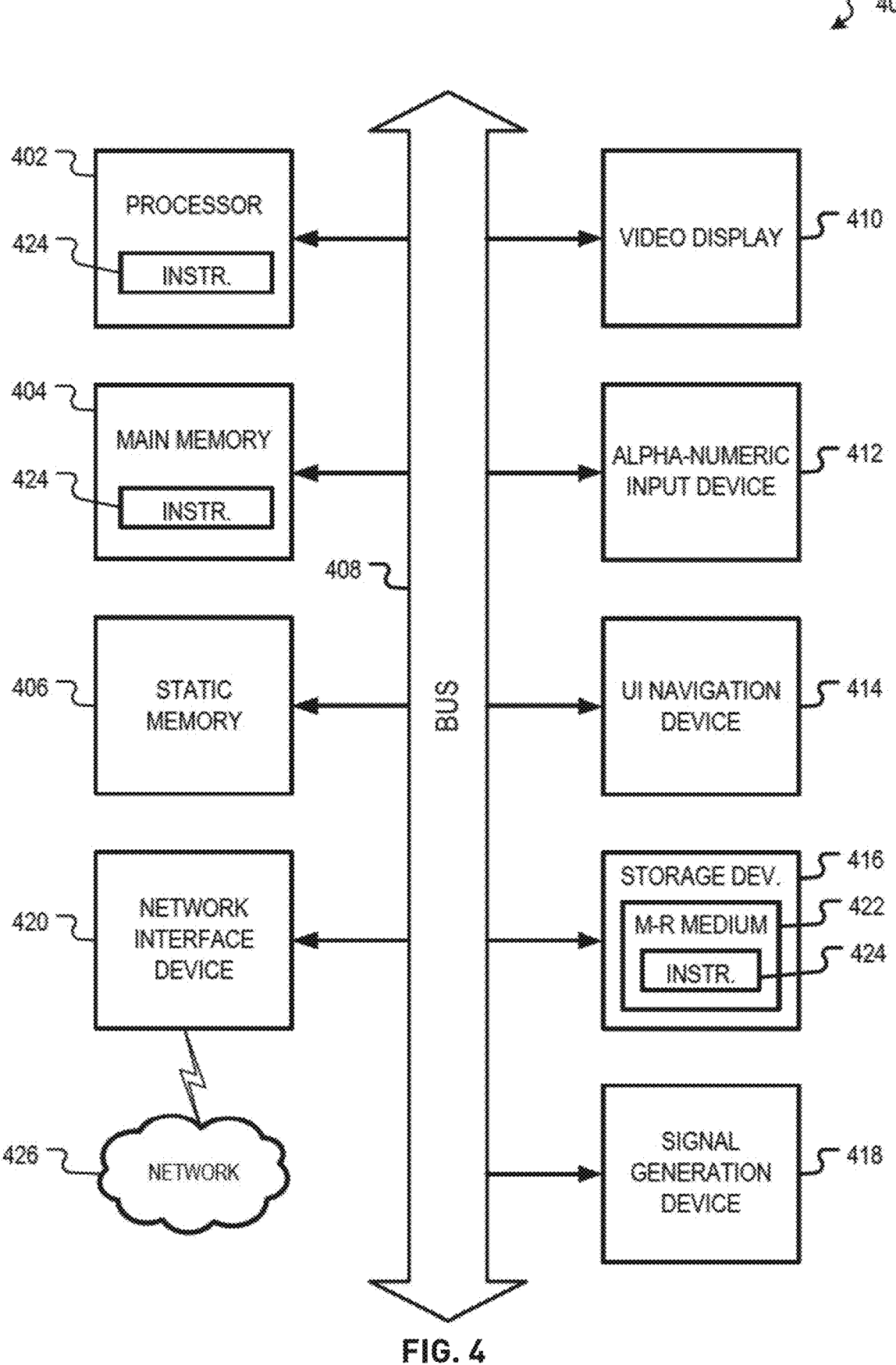
FIG. 4 is a block diagram illustrating a computing device hardware architecture, according to some examples.

FIG. 4 is a block diagram illustrating a hardware architecture 400 of an example computing device, within which a set or sequence of instructions can be executed to cause a machine to perform examples of any one of the methodologies discussed herein. The hardware architecture 400 describes a computing device for executing the vehicle autonomy system, described herein.

The hardware architecture 400 may operate as a standalone device or may be connected (e.g., networked) to other machines. In a networked deployment, the hardware architecture 400 may operate in the capacity of either a server or a client machine in server-client network environments, or it may act as a peer machine in peer-to-peer (or distributed) network environments. The hardware architecture 400 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example hardware architecture 400 includes a processor unit 402 comprising at least one processor (e.g., a central processing unit (CPU), a graphics processing unit (GPU), or both, processor cores, compute nodes). The hardware architecture 400 may further comprise a main memory 404 and a static memory 406, which communicate with each other via a link 408 (e.g., a bus). The hardware architecture 400 can further include a video display unit 410, an input device 412 (e.g., a keyboard), and a UI navigation device 414 (e.g., a mouse). In some examples, the video display unit 410, input device 412, and UI navigation device 414 are incorporated into a touchscreen display. The hardware architecture 400 may additionally include a storage device 416 (e.g., a drive unit), a signal generation device 418 (e.g., a speaker), a network interface device 420, and one or more sensors (not shown), such as a Global Positioning System (GPS) sensor, compass, accelerometer, or other sensor.

In some examples, the processor unit 402 or another suitable hardware component may support a hardware interrupt. In response to a hardware interrupt, the processor unit 402 may pause its processing and execute an ISR, for example, as described herein.

The storage device 416 includes a machine-readable medium 422 on which is stored one or more sets of data structures and instructions 424 (e.g., software) embodying or used by any one or more of the methodologies or functions described herein. The instructions 424 can also reside, completely or at least partially, within the main memory 404, within the static memory 406, and/or within the processor unit 402 during execution thereof by the hardware architecture 400, with the main memory 404, the static memory 406, and the processor unit 402 also constituting machine-readable media.

Executable Instructions and Machine-Storage Medium

The various memories (i.e., main memory 404, static memory 406, and/or memory of the processor unit(s) 402) and/or the storage device 416 may store one or more sets of instructions and data structures (e.g., the instructions 424) embodying or used by any one or more of the methodologies or functions described herein. These instructions, when executed by the processor unit(s) 402, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both non-transitory machine-storage media and signal media. Thus, the terms include both storage devices/media and carrier waves/modulated data signals.

The instructions 424 can further be transmitted or received over a communications network 426 using a transmission medium via the network interface device 420 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Figure 5:
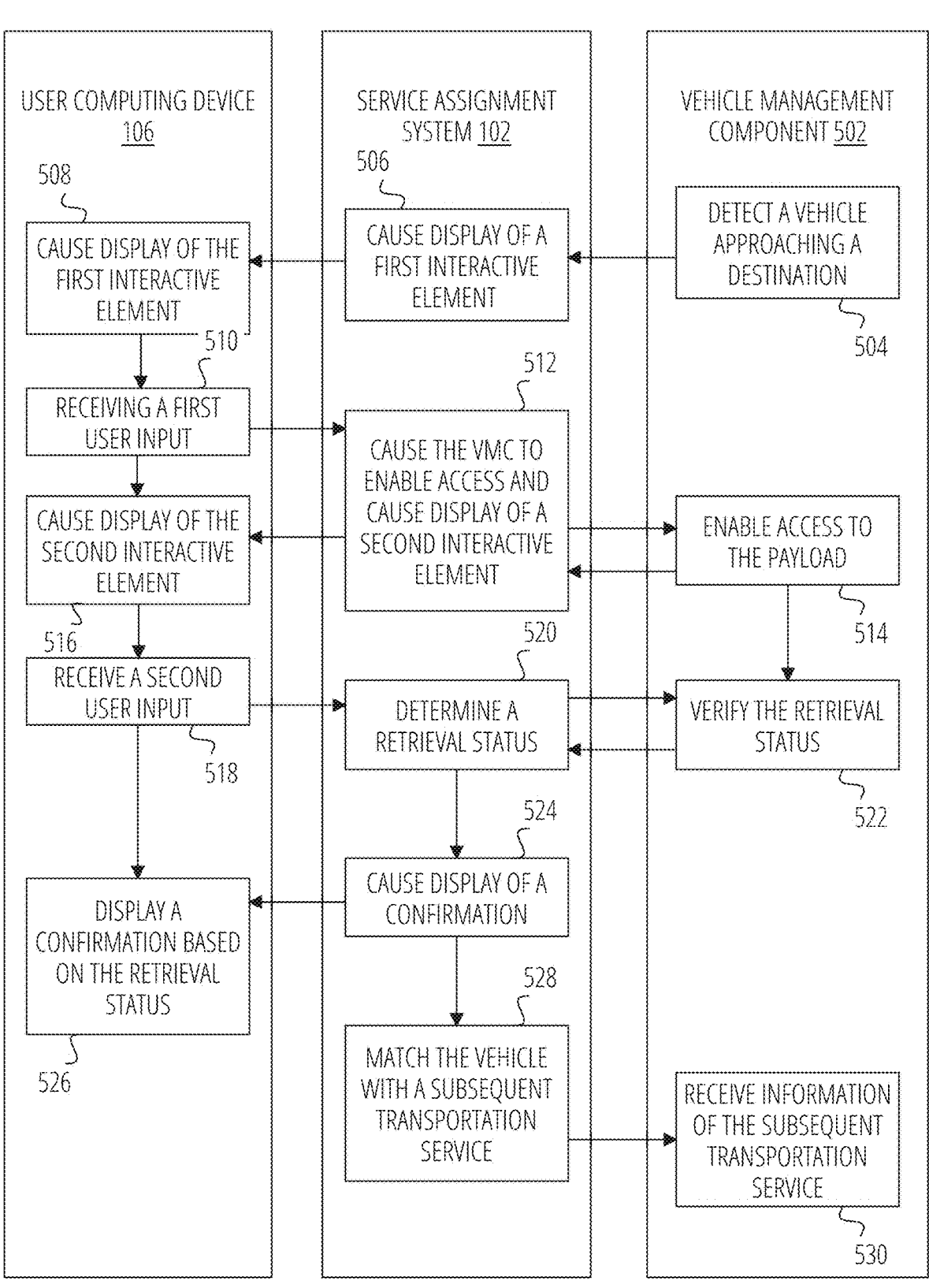
FIG. 5 illustrates method 500 for performing user-initiated end of delivery confirmation using a computing device, a service assignment system, and a vehicle management component, according to some examples.

FIG. 5 illustrates method 500 for performing user-initiated end of delivery confirmation using a user computing device 106, a service assignment system 102, and a vehicle management component 502, according to some examples.

A vehicle management component 502 may be installed in a vehicle. In other words, a vehicle may comprise a vehicle management component 502. The vehicle management component 502 may be communicatively coupled to the AV provider system 108, vehicle autonomy system 202 of the vehicle, one or more vehicle controls 207 of the vehicle, the service assignment system 102, or one or more user computing devices 106. In some examples, the AV provider system 108 manages or otherwise operates the vehicle via the vehicle management component 502. The vehicle management component 502 may receive the service offers from the service assignment system 102 and reply to the service assignment system 102. In some examples, the vehicle management component 502 communicates with the service assignment system 102 to receive service offers and determine whether to accept or decline the service offers based on a vehicle status.

In some examples, a vehicle management component 502 is implemented as a remote server associated with the AV provider system 108. In some examples, the vehicle management component 502 comprises a plurality of computing devices communicatively coupled to the one or more vehicles. The AV provider system 108 may manage or operate the AVs remotely via the vehicle management components 502.

In some examples, the vehicle management component 502 is implemented as a decentralized computing system that coordinates processing tasks across a plurality of vehicles. The vehicle management component 502 may utilize processing units from the plurality of vehicles to collectively execute various functions of the vehicle management component 502 through the decentralized computing system. In these examples, the vehicle management component 502 comprises a plurality of processing units that are installed within the plurality of vehicles, wherein the plurality of processing units is communicatively coupled to each other to form the decentralized computing system. In some examples, the plurality of processing units installed in the plurality of vehicles are configured to share computing responsibilities by dividing and distributing the various functions tasks among the plurality of processing units. For example, a processing unit within each vehicle performs specific portions of a function of the vehicle management component 502. Results from the individual processing unit of the plurality of processing units may aggregated or synchronized to collectively provide a full functionality of the vehicle management component 502. For example, one vehicle's processing unit may process order details associated with a service offer while another vehicle's processing unit may determine the vehicle status.

At block 504, the vehicle management component 502 may detect a vehicle approaching a destination. The vehicle management component 502 may detect the vehicle approaching the destination based on a vehicle location or a remaining time. The remaining time may be an estimated time remaining until the vehicle arrives at the service end location. In some examples, the vehicle management component 502 detects the vehicle is approaching the destination based on the vehicle location being within a predetermined distance threshold from the destination. In some examples, the vehicle management component 502 detects the vehicle is approaching the destination based on the remaining time. In response to detecting the vehicle approaching the destination, the vehicle management component 502 may cause the service assignment system 102 or the user computing device to perform subsequent operations. In some examples, the service assignment system 102 or the user computing device 106 independently determines that the vehicle is approaching the destination based on a vehicle location, service end location, or remaining time, rendering block 504 optional.

At block 506, the service assignment system 102 may cause display of a first interactive element. The service assignment system 102 may cause display of a first interactive element on a user computing device 106 in response to the vehicle approaching the destination. In some examples, the service assignment system 102 instructs the user computing device 106 to display a first interactive element (e.g., first interactive element 818). For example, the service assignment system 102 may cause the user computing device 106 to display an "unlock" button on a graphical user interface that, when pressed by the user, causes the vehicle to enable access to the payload stored within. The first interactive element may be configured to cause the vehicle to enable access based on a first user input through the displayed GUI.

At block 508, the user computing device 106 may display the first interactive element. The user computing device 106 may display the first interactive element in response to the vehicle approaching the destination. A determination of the vehicle approaching the destination may be made independently by the user computing device 106, received from the service assignment system 102, or received from the vehicle management component 502. In response to determining that the vehicle is approaching the destination, the user computing device 106 displays the first interactive element configured to receive a first user input. For example, the user computing device 106 displays an "unlock" button, upon contact of which would cause the vehicle to enable access to the vehicle. In some examples, the first interactive element may be any type of interactive element such as a button, a switch, a slider, a toggle, a checkbox, or a dropdown menu option that is configured to receive the first user input comprising a first user interaction with the first interactive element. The first user input may enable the user to gain temporary or partial control over the vehicle. The display of the first interactive element provides a way for the user who does not own the vehicle to gain authorized access for retrieving payloads under certain circumstances (e.g., the vehicle is at the destination).

At block 510, the user computing device 106 may receive a first user input. The user computing device 106 may receive the first user input indicating an intent to access a payload stored within the vehicle. In some examples, the first user input comprises a first user interaction with the first interactive element displayed on the second GUI of the user computing device 106. For example, the first user interaction comprises a tap on the button labeled "unlock." In some examples, the first user interaction comprises a swipe, a selection selecting a checkbox, or selecting an option from a dropdown menu. The user computing device 106 may be configured to interpret the first user interaction as the intent to access the payload stored in the vehicle and communicate the intent to access to the vehicle management component 502 via the service assignment system 102.

At block 512, the service assignment system 102 may cause the vehicle management component 502 to enable access and cause display of a second interactive element. In some examples in which the user computing device 106 is not in direct communication with the vehicle management component 502, the service assignment system 102 communicates the intent to access by the user to the vehicle management component 502 in response to receiving the first user input by the user computing device 106. In some examples, in response to receiving the first user input, the service assignment system 102 causes the display of the second interactive element (e.g., second interactive element 830) on the user computing device 106. The second interactive element may be configured to receive a second user input indicating a successful retrieval of the payload.

At block 514, the vehicle management component 502 may enable access to the payload. In some examples, enabling access may include unlocking a trunk, a door, or other storage spaces where the payload may be stored. As explained above, the vehicle management component 502 may be communicatively coupled to the one or more vehicle controls 207 that include one or more actuators configured to open a storage space, a window, a trunk, or a door of the vehicle. The vehicle management component 502 may automatically open and close a storage space, such as automatically opening the trunk after unlocking. In a specific example, the vehicle management component 502 causes the vehicle to unlock a storage space containing the payload in response to receiving the first user input by the user computing device 106 so that the user can access the payload. In some examples, the vehicle management component 502 notifies the service assignment system 102 that the access to the payload is enabled. The service assignment system 102 may cause the display of the second interactive element based on the notification.

At block 516, the user computing device 106 may display the second interactive element. The user computing device 106 may display the second interactive element (e.g., second interactive element 830) as instructed by the service assignment system 102. Alternatively, the user computing device 106 may display the second interactive element in response to receiving the first user input, absent any instructions from the service assignment system 102. The second interactive element may be designed to elicit a second user input that indicates the successful retrieval of the payload. In some examples, the second user input comprises a second user interaction. Similar to the first interactive element, the second interactive element may be implemented as any type of interactive element that a user may interact with, such as a button, a switch, a slider, a toggle, a checkbox, or a dropdown menu option that is configured to receive the second user input comprising a second user interaction with the second interactive element. In some examples, the second interactive element is labeled with a prompt designed to elicit a retrieval status from the user. For example, the second interactive element is labeled as "I've got my order!" In some examples, the displaying of the second interactive element occurs after the vehicle management component 502 has enabled access to the payload.

At block 518, the user computing device 106 may receive a second user input. The second user input may indicate that the user has retrieved the payload. The second user input may comprise a second user interaction with the second interactive element. In some examples, the second user interaction comprises a press on the second interactive element. In some examples, to prevent accidental interactions, the second interactive element may be implemented as a slider that prompts the user to perform a sliding gesture from left to right. The user computing device 106 may register the sliding gesture as the received second user interaction. In some examples, the second user interaction comprises at least one of a long press or hold gesture on the second interactive element, a plurality of taps in sequence, a swipe gesture in a specific pattern or direction, and selecting a checkbox. In response to receiving the second user input, the user computing device 106 may communicate the second user input to the service assignment system 102.

At block 520, the service assignment system 102 may determine the retrieval status. The retrieval status may indicate whether the payload has been successfully retrieved from the vehicle. The retrieval status may be used by other processes, such as matching the vehicle with a subsequent transportation service based on the retrieval status. In some examples, the retrieval status comprises a non-retrieved state and a retrieved state. In some examples, the service assignment system 102 determines the retrieval status based on the second user input received from the user computing device 106. In some examples, the retrieval status is communicated to the vehicle management component 502 for verification. In some examples, the service assignment system 102 determines the retrieval status based on both the second user input and a verification received from the vehicle management component 502. In some examples, performing the block 520 to determine the retrieval status by the service assignment system 102 is optional, because the user computing device 106 may independently determine the retrieval status based on the second user input.

At block 522, the vehicle management component 502 may verify the retrieval status. The vehicle management component 502 may verify the retrieval status of the payload in response to enabling access to the vehicle in block 514. The vehicle management component 502 may detect whether the payload has been retrieved using a storage space camera, a light sensor, or a weight sensor coupled to the vehicle. In some examples, the vehicle management component 502 detects changes in the storage space using the storage space camera. In some examples, the vehicle management component 502 uses the light sensor to detect changes in the storage space. In some examples, the vehicle management component 502 uses the weight sensor to measure payload presence. In some other examples, the vehicle management component 502 detects the retrieval status based on detecting an opening and closing of the storage space (e.g., a trunk). In some examples, the vehicle management component 502 verifies the retrieval status using an artificial intelligence model that is trained to detect payload presence based on data received from the storage space camera, the light sensor, or the weight sensor. In some examples, the second user input may be used as training data to improve the artificial intelligence model in detecting payload presence or payload absence. In some examples, performing the block 522 to verify the retrieval status is optional, because the service assignment system 102 or the user computing device 106 may rely on the second user input to determine the retrieval status. While performing the block 522 is not required, performing block 522 may provide enhanced confidence in the retrieval status. For example, when the vehicle management component 502 fails to verify the retrieval status based on the vehicle management component 502 detects a payload presence after receiving the second user input, the service assignment system 102 may flag this case for further analysis or cause the user computing device 106 to ask for further confirmation by the user.

At block 524, the service assignment system 102 may cause display of a confirmation in response to determining the retrieval status. The service assignment system 102 may cause the user computing device 106 to display the confirmation.

At block 526, the user computing device 106 may display a confirmation. In some examples, the user computing device 106 is instructed by the service assignment system 102 to display the confirmation. In some alternative examples, the user computing device 106 may independently display the confirmation in response to receiving the second user input. The confirmation may comprise an end-of-service message, the retrieval status, the vehicle status, order details, or order status. The retrieval status may be received from the vehicle management component 502 and the order details may be received from the service assignment system 102. For example, the confirmation includes a vehicle status indicating that the vehicle is departing, an end-of-service message that prompts the user to perform post-delivery actions such as providing a rating for the transportation service, and the order details associated with the transportation service that was completed. The confirmation may comprise the retrieval status. For a specific example, the user computing device 106 displays the confirmation that shows: "order delivered [.] You're all set. The vehicle will depart shortly." In this example, the order status is indicated by "order delivered," the end-of-service message includes "[y]ou're all set [,]" and the vehicle status is indicated by "[t]he vehicle will depart shortly."

At block 528, the service assignment system 102 may match the vehicle with a subsequent transportation service. The service assignment system 102 may match the vehicle with a subsequent transportation service prior to or after the payload is retrieved. In some examples, the service assignment system 102 adjusts a priority level associated with the vehicle in a service queue based on the retrieval status. In some examples, the service queue includes a plurality of vehicles that are evaluated and sorted based on priority levels. The service assignment system 102 assigns subsequent transportation service to vehicles based on the positions of the vehicle within the service queue. Vehicles with high priority levels may be more likely to get assigned to a subsequent transportation service than those with the low priority levels. For example, the vehicle is given a low priority level based on the non-retrieved state. In response to switching the retrieval status from the non-retrieved state to the retrieved state, the vehicle is given a high priority level.

The service assignment system 102 may utilize forward dispatching, which enables proactive matching of vehicles with upcoming deliveries before a current transportation service (e.g., a current order) is completed. The positions in the service queue may be determined by a plurality of factors that include the retrieval status. The plurality of factors further comprises of vehicle location and vehicle status. As vehicles progress through transportation services, positions in the service queue may be dynamically adjusted based on the progress or changes in the plurality of factors. The service assignment system 102 may send the information of the subsequent transportation service to the AV provider systems 108 or the vehicle management component 502 in response to matching the vehicle with a subsequent transportation service.

At block 530, the vehicle management component 502 may receive information of the subsequent transportation service. The information of the subsequent transportation service may cause the vehicle to perform the subsequent transportation service. In some examples, the information of the subsequent transportation service includes subsequent order details that includes an address of a payload provider system or a new service end location. In some examples, the information of the subsequent transportation service may include timing details. In some examples, the vehicle management component 502 may communicate with the commander system to cause the vehicle to navigate to the address associated with a payload provider system or a service end location.

Figure 6:
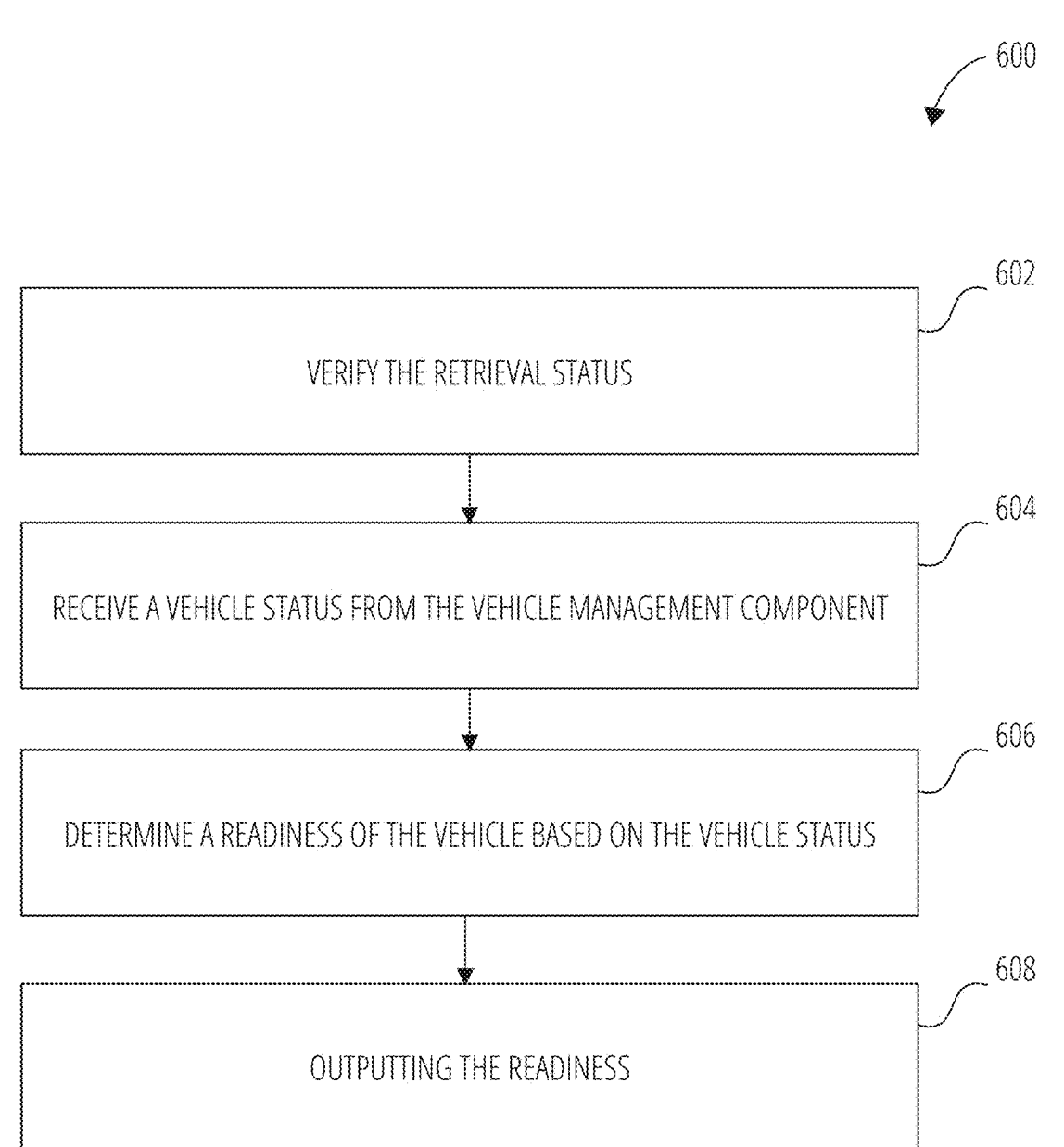
FIG. 6 is a flowchart illustrating method 600 for determining vehicle status, according to some examples.

FIG. 6 is a flowchart illustrating method 600 for determining vehicle status, according to some examples.

At block 602, the vehicle management component 502 may verify a retrieval status. Block 602 may be performed in a manner similar to that described with respect to block 522 of FIG. 5.

At block 604, the vehicle management component 502 may determine a vehicle status. In some examples, the vehicle management component 502 determines the vehicle status in response to verifying the retrieval status. In some examples, the vehicle management component 502 determines the vehicle status based on one or more parameters. The one or more parameters may be determined based on data received from a plurality of sensors installed within the vehicle. The one or more parameters may include a fuel level, a battery level, a cabin condition, the retrieval status, one or more fault codes, or a current navigation task being performed by the vehicle autonomy system. The fuel level or battery level of the vehicle may determine an estimated distance that the vehicle could travel. The vehicle management component 502 may ensure the vehicle has sufficient fuel or battery level to complete additional transportation services.

In some examples, the cabin condition includes whether any doors or storage spaces of the vehicle remain unlocked or unclosed.

In some examples, the cabin condition includes a cabin temperature or a storage space temperature. The cabin temperature or storage space temperature may determine whether the vehicle is suitable for food delivery. For example, the vehicle management component 502 determines that the vehicle is ready for a subsequent transportation service based on the cabin temperature or the storage space temperature being within a predetermined temperature range.

In some examples, the cabin condition includes whether the cabin or storage space has been sanitized for food delivery services. For example, in response to verifying the retrieval status, the vehicle management component 502 causes the vehicle to spray sanitizer in the storage space or the cabin and mark one of the cabin conditions as "sanitized."

In some examples, the cabin condition includes whether any items are left behind by previous users of the transportation services. In some examples, the plurality of sensors includes a cabin-facing camera or the storage space camera. The vehicle management component 502 may identify a forgotten item left in the cabin or the storage space using the cabin-facing camera or the storage space camera. In some examples, in response to identifying the forgotten item, the vehicle management component 502 may notify the service assignment system 102, which may notify a previous user via the user computing device 106 associated with the previous user. In some examples, in response to identifying the forgotten item, the vehicle may navigate to a service end location associated with the previous transportation service or a location specified by the previous user.

In some examples, vehicle management component 502 receives the one or more fault codes from various vehicle systems such as the perception system, prediction system, motion planning system, and vehicle controls. In some examples, an absence of any active fault codes is one parameter used to determine a readiness of the vehicle for subsequent transportation services, as fault codes indicating system malfunctions would make the vehicle unsuitable for safely performing additional transportation services.

In some examples, the vehicle management component 502 accesses the current navigation task being performed by the vehicle autonomy system. For example, the vehicle management component 502 may determine that the vehicle is departing shortly for a subsequent service end location.

At block 606, the vehicle management component 502 may determine a readiness of the vehicle based on the vehicle status. In some examples, a readiness of the vehicle is determined based on the vehicle status. In some examples, the vehicle management component 502 determines the readiness of the vehicle is ready for a subsequent transportation service based on the vehicle status satisfying one or more preset conditions. The readiness being ready may indicate that the vehicle is suitable for providing the subsequent transportation service. For example, the vehicle status is ready for a subsequent transportation service based on the battery level meeting a minimum threshold for a subsequent transportation service. For example, the vehicle management component 502 determines that the vehicle is not suitable for providing any subsequent transportation service based on the battery level or range left transgressing the minimum threshold (e.g., calculated by a service end location of a subsequent transportation service). For example, the vehicle management component 502 determines that the vehicle is ready for the subsequent transportation service based on the cabin condition satisfying one or more preset cabin conditions. In some examples, the readiness of the vehicle is communicated to the service assignment system 102. In some examples, the block 606 is optional as the service assignment system 102 may match the vehicle with a subsequent transportation service based on the vehicle status.

At block 608, the vehicle management component 502 outputs the determined readiness. In some examples, the vehicle management component 502 outputs the readiness to the service assignment system 102. The service assignment system 102 may match the vehicle with the subsequent transportation service based on the readiness received from the vehicle management component 502. In some examples, the vehicle management component 502 outputs the vehicle status to the service assignment system 102. The service assignment system 102 may match the vehicle with a subsequent transportation service based on the vehicle status.

Figure 7:
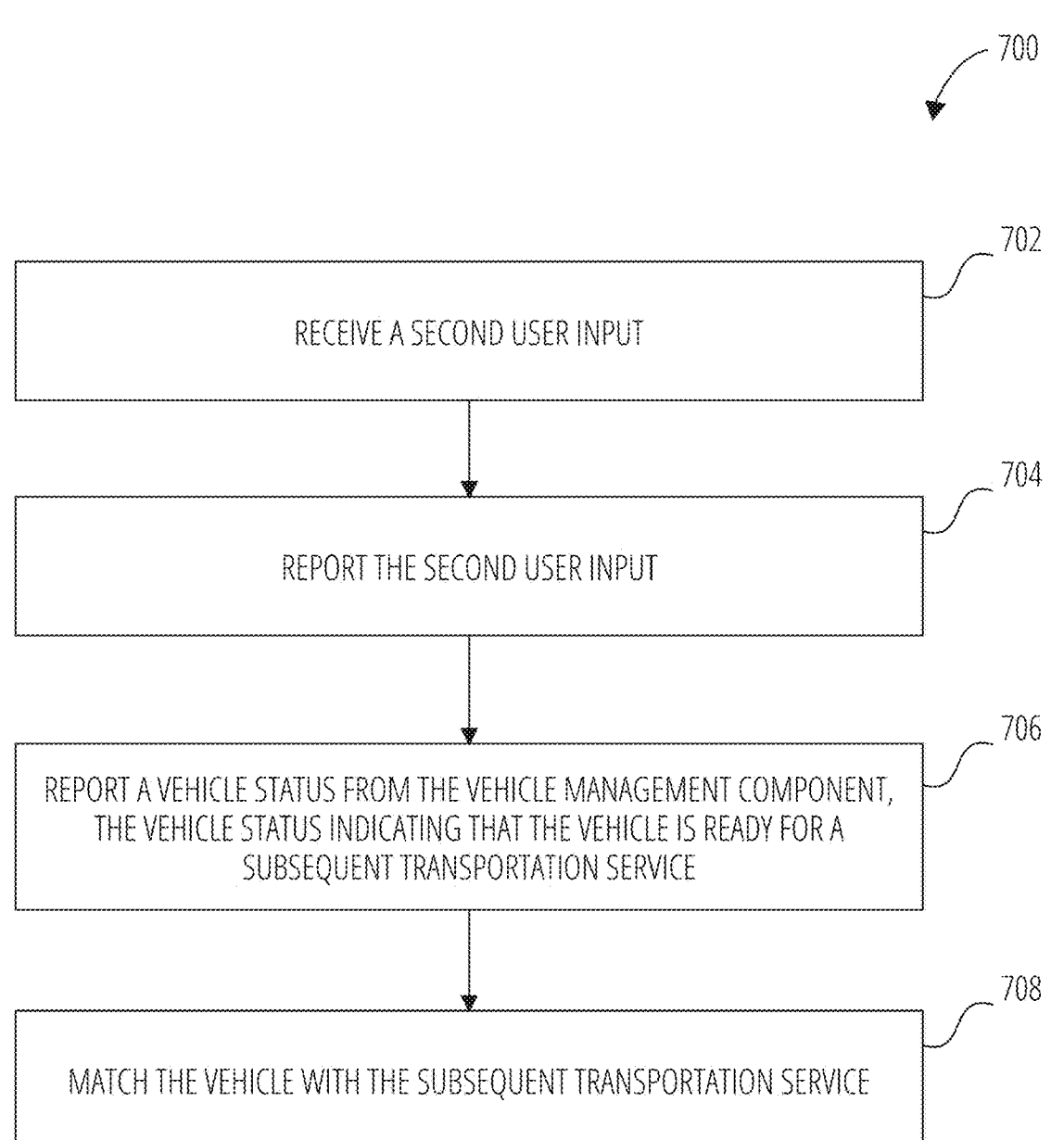
FIG. 7 is a flowchart illustrating method 700 for reporting determining a vehicle is ready for a subsequent transportation service, according to some examples.

FIG. 7 is a flowchart illustrating method 700 for reporting determining a vehicle is ready for a subsequent transportation service, according to some examples.

At block 702, the service assignment system 102 may receive a second user input. The second user input may indicate that the user has retrieved the payload. The second user input may comprise a second user interaction with the second interactive element displayed on the user computing device 106. The user computing device 106 may report the second user input to the service assignment system 102. The block 702 may be performed in a manner similar to that described with respect to block 518 of FIG. 5.

At block 704, the service assignment system 102 may report the second user input to the vehicle management component 502 in response to receiving the second user input. In some examples, the user computing device 106 reports the received second user input to the service assignment system 102 only, and the service assignment system 102 may perform the block 528 based on the received second user input.

At block 706, the service assignment system 102 receives the a vehicle status from the vehicle management component 502. In some examples, in response to the second user input, the vehicle management component 502 reports the vehicle status to the service assignment system 102, and the service assignment system 102 receives the reported vehicle status from the vehicle management component 502. In some examples, the service assignment system 102 performs the block 528 based on the vehicle status.

At block 708, the service assignment system 102 may match the vehicle with a subsequent transportation service. In some examples, the service assignment system 102 matches the vehicle with the subsequent transportation service based on the second user input. In some other examples, the service assignment system 102 matches the vehicle with the subsequent transportation service based on the second user input and the vehicle status. For example, the second user input indicates that the user has successfully retrieved the payload, and the vehicle status indicates that the vehicle is ready for the subsequent transportation service. The service assignment system 102, therefore, matches the vehicle with the subsequent transportation service based on the second user input and the vehicle status. Block 708 may be performed in a manner similar to that described with respect to block 528 of FIG. 5.

Figures 8A, 8B, 8C:
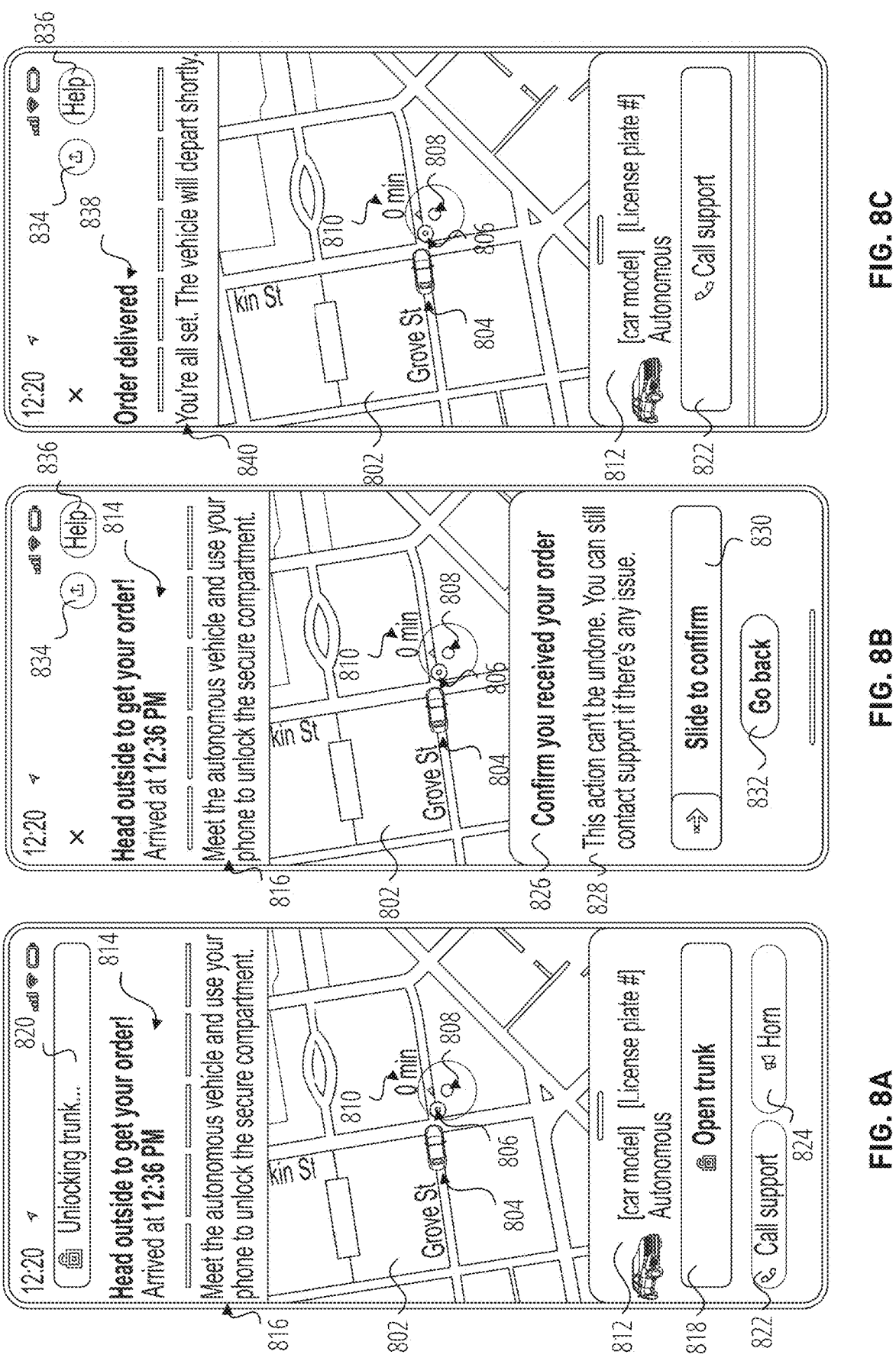
FIGS. 8A-8C illustrate the graphical user interfaces displayed on a computing device, according to some examples.

FIGS. 8A-8C illustrate the graphical user interfaces displayed on a user computing device, according to some examples. The graphical user interfaces may be displayed via a display device of the user computing device 106. The graphical user interfaces may be produced by a client application associated with the service assignment system 102, wherein the client application may be executed by the user computing device 106. The user may request a transportation service through the client application by interacting with the various interactive elements displayed on the graphical user interfaces.

FIG. 8A illustrates a first graphical user interface produced by the client application, according to some examples. The graphical user interface illustrated in FIG. 8A includes order details associated with a transportation service. In some examples, the order details include vehicle location (e.g., vehicle location 804), service end location (e.g., service end location 806), user location (e.g., user location 808), remaining time (e.g., remaining time 810), or vehicle information (e.g., vehicle information 812). Order details may further include an order status, retrieval status, vehicle status, an estimated time of arrival, or an actual time of arrival. In some examples, the vehicle location, the service end location, or the user location may be displayed in a map view. The map view may includes displaying a map (e.g., map 802) with the vehicle location, service end location, or the user location indicated on the map.

The first graphical user interface may further include vehicle information 812 or one or more action prompts (e.g., first action prompt 814, second action prompt 816.) The vehicle information 812 may include an icon, a car model, license plate information, or a vehicle type. In some examples, the icon includes an image representing the vehicle. In some examples, the car model includes information about a make, a model year, a color, or a model of the vehicle. The one or more action prompts may provide instructions to a user action needed to complete the transportation service. For example, the first action prompt 814 prompts the user to head outside to get the order. The second action prompt 816 prompts the user to meet the vehicle and the user computing device 106 to unlock the storage space of the vehicle. The one or more action prompts may be replaced by order status or other information based on no further user action is due in another graphical user interface.

The user may temporarily gain partial control over the vehicle via the first graphical user interface. The first graphical user interface may be displayed on a user computing device 106, which is communicatively coupled to the service assignment system 102. The service assignment system 102 is communicatively coupled to the vehicle management component 502 or the AV provider system 108, enabling the partial control over the vehicle. In some examples, partial control over the vehicle includes accessing a storage space within the vehicle. In some examples, as the vehicle approaches the service end location 806, the service assignment system 102 causes display of a first interactive element (e.g., first interactive element 818) on the first graphical user interface at the user computing device 106. In the example illustrated in FIG. 8A, the first interactive element 818 comprises a button labeled with "Open Trunk [.]" In response to the user contacting the first interactive element 818, the user computing device 106 may cause the vehicle to enable access. In some examples, in response to the user touching the first interactive element 818, the user computing device 106 causes the vehicle to enable access via the service assignment system 102 or the vehicle management component 502. For example, in response to receiving the first user input comprising a first user interaction with the first interactive element 818, the user computing device 106 communicates an intent to access to the service assignment system 102, the service assignment system 102 communicates the intent to access to the vehicle management component 502, and the vehicle management component 502 causes the vehicle to enable access in response to the intent to access.

The first graphical user interface may include various information. In some examples, in response to receiving the first user input, the user computing device 106 or the service assignment system 102 causes display of a status message (e.g., status message 820) indicating that the intent to access is being processed. For example, the status message 820 comprises a message, "Unlocking trunk . . . [,]" to indicate that one or more components are enabling access to the storage space in the background. In some examples, the first graphical user interface may be displayed in response to the blocks 504, 506, or 508 described with reference to FIG. 5.

FIG. 8B illustrates a second graphical user interface produced by the client application, according to some examples. Similar to the first graphical user interface, the second graphical user interface may include a map view displaying a map (e.g., map 802) with vehicle location (e.g., vehicle location 804), service end location (e.g., service end location 806), and user location (e.g., user location 808), or remaining time (e.g., remaining time 810).

The second graphical user interface may include a third action prompt (e.g., third action prompt 826) associated with the second interactive element. For the example illustrated in FIG. 8B, the third action prompt 826 prompts the user to confirm that the user has retrieved the payload. The second action prompt 816 includes a text string that reads "[c] onfirm you received your order [.]" The second graphical user interface may include a warning message (e.g., warning message 828) associated with the second interactive element. The warning message illustrated in FIG. 8B reads "[t]his action can't be undone. You can still contact support if there's any issue."

The second graphical user interface may include a second interactive element (e.g., second interactive element 830). The user computing device 106 may receive a second user input comprising a second user interaction with the second interactive element as a confirming retrieval of the payload. In some examples, the second interactive element 830 comprises a slider that requires the user to perform a sliding gesture as the second user interaction to confirm the retrieval status, rather than a simple button click. The sliding gesture may prevent accidental confirmation. For example, the second interactive element 830 comprises a "slide to confirm" slider that, when activated through the sliding gesture, causes the service assignment system 102 to determine the retrieval status. The retrieval status may be communicated to the vehicle management component 502.

In some examples, the confirmation action cannot be undone, as indicated by the warning message. The confirmation cannot be undone because confirming the retrieval status may cause the order status to be marked completed or cause the service assignment system 102 to match the vehicle with a subsequent transportation service, potentially causing the vehicle to depart from the service end location. In some examples in which the user is not ready to confirm the retrieval status, the user may select the third interactive element (e.g., third interactive element 832) labeled "Go back" instead of performing the sliding gesture.

The second graphical user interface may include a third interactive element (e.g., third interactive element 832). The third interactive element may provide the user with an option to return to the first graphical user interface (e.g., the first graphical user interface). In some examples, the third interactive element 832 is displayed in response to receiving the first user input that comprises the first user interaction with the first interactive element 818. The first graphical user interface or the fourth graphical user interface may allow the user to make additional attempts at enabling vehicle access, call support, or locate the vehicle. In some examples, in response to receiving a third user input that includes a third interaction with the third interactive element, a fourth graphical user interface is displayed. The fourth graphical user interface may includes the first interactive element 818, the second interactive element 830, the support button 822, or the find vehicle button 824. In some examples in which the vehicle fails to provide access to the storage space, the user may use the third interactive element 832 to be directed to the first graphical user interface or the fourth graphical user interface to interact with the first interactive element 818 to gain the partial control over the vehicle again. For another example, the user may use the support button 822, the find vehicle button 824, or the second interactive element 830 displayed in the first graphical user interface or the fourth graphical user interface.

The second graphical user interface may include a share button (e.g., share button 834). The share button 834 may enable the user to share order details associated with the transportation service to other users. The share button 834 may facilitate communication between the user and other users involved in a group order. In some examples, a primary user places a transportation service request and a secondary user is designated to retrieve the payload. In these examples, the share button 834 allows the primary user to communicate with the secondary user prior to confirming the retrieval status. In some examples, in response to the primary user sharing the transportation service with the secondary user, who is retrieving a payload, the service assignment system 102 causes a computing device associated with the secondary user to display a graphical user interface that includes the second interactive element 830 (e.g., the second graphical user interface), enabling the secondary user to provide a second user interaction with the second interactive element 830 to confirm retrieval status, on behalf of the primary user. Therefore, the secondary user, who is in a better position to verify the retrieval status, has the opportunity to do so if the primary user can provide that option via the share button 834. In some examples, in response to sharing the transportation service with a secondary user by a primary user, both the secondary user is granted partial control over the vehicle. For example, the secondary user may be directed, by the computing device associated with the secondary user, to a first graphical user interface, on which the secondary user may perform actions such as viewing the one or more action prompts, enabling access to the vehicle using the first interactive element 818, or find vehicle via the find vehicle button 824.

The second graphical user interface may include a help button 836. The help button 836 may provide users with access to various support resources and assistance options during the transportation service. In some examples, in response to activating the help button 836, the user computing device 106 provides a support interface that includes the support button 822 that comprises a call option configured to dial a support number to get manual support by communicating with support agents. In some examples, the support interface provides multiple support options including text messaging capabilities, self-help resources, and ticket submission functionality for the user encountering issues. In some examples, users who encounter difficulties during payload retrieval may use the help button 836 to connect with the service assignment system 102 through various communication methods including voice calls, text messaging, or email. The service assignment system 102 may instruct the vehicle management component 502 to enable vehicle access. In some examples, the second graphical user interface may be displayed in response to the blocks 510, 512, or 514 described with reference to FIG. 5.

FIG. 8C illustrates a third graphical user interface produced by the client application, according to some examples. The third graphical user interface may include a map view displaying a map (e.g., map 802) with vehicle location (e.g., vehicle location 804), service end location (e.g., service end location 806), and user location (e.g., user location 808), or remaining time (e.g., remaining time 810). The third graphical user interface may include vehicle information 812, support button 822, share button 834, or help button 836. The third graphical user interface may further includes the confirmation including an order status 838 or a status message 840.

The third graphical user interface may include an order status (e.g., order status 838) associated with the transportation service. In some examples, the order status indicating that the "order [has been] delivered" is displayed in response to the user confirming retrieval of the payload via the second interactive element 830. The user computing device 106 may show the order status to provide clear indication on a completion of the transportation service.

The third graphical user interface may include a status message (e.g., status message 840) to provide users with a clear indication on the completion of the transportation service. In some examples, the status message 840 includes an end-of-service message and a vehicle status.

In some examples, in response to a user confirming payload retrieval through the second interactive element 830, the third graphical user interface is displayed.

In some examples, support button 822 is displayed in this graphical user interface. In some examples, the user mistakenly confirms payload retrieval via the second interactive element 830. The third graphical user interface provides an option to adjust the retrieval status via the support button 822, which as explained above, provides various ways to communicate with the service assignment system 102. The service assignment system 102 may adjust the order status or the retrieval status. In some examples, the service assignment system 102 may cancel any subsequent transportation service matched with the vehicle. In some examples, the service assignment system 102 may cause a vehicle that has left to return to the service end location in response to adjusting the order status. The adjusting the order status may indicate that the payload associated with the previous transportation service may still be in the vehicle. In some examples, the third graphical user interface may be displayed in response to the blocks 518, 520, 522, or 524 described with reference to FIG. 5.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

What is claimed is:

1. A method, comprising:
causing display of a first interactive element on a user device in response to vehicle carrying a payload approaching a destination;
receiving a first user input comprising a first user interaction with the first interactive element;
in response to receiving the first user input, causing a vehicle management component communicatively coupled to the vehicle to enable access to the payload in the vehicle and causing display of a second interactive element on the user device;
receiving a second user input from the user device, the second user input comprising a second user interaction with the second interactive element;
determining a retrieval status associated with the payload based on the second user interaction;
sending a signal to the vehicle management component in response to the second user interaction, the signal comprising the retrieval status and a request to verify the retrieval status;
receiving a verified retrieval status associated with the payload;
generating a confirmation based on the verified retrieval status;

causing display of a confirmation on the user device based on retrieval status, the confirmation indicating that the payload has been retrieved; and
causing the vehicle to autonomously navigate to a subsequent destination.

2. The method of claim 1, further comprising matching the vehicle with a subsequent transportation service based on the retrieval status; and wherein the signal further comprises information of the subsequent transportation service.

3. The method of claim 1, further comprising:
receiving a vehicle status from the vehicle management component, the vehicle status indicating that the vehicle is ready for a subsequent transportation service; and
matching the vehicle with the subsequent transportation service based on the vehicle status.

4. The method of claim 3, further comprising:
determining a readiness, by the vehicle management component, based on the vehicle status of the vehicle, the vehicle status comprising a battery level.

5. The method of claim 1, further comprising:
changing a matching priority associated with the vehicle, the matching priority determining a rate at which the vehicle is matched with a subsequent transportation service.

6. The method of claim 1, further comprising:
causing display, on the user device, a third interactive element in response to receiving the second user input; and
causing display, on the user device, the first interactive element and the second interactive element in response to receiving a third user input comprises a third user interaction with the third interactive element.

7. The method of claim 1, further comprising:
receiving first location data associated with the vehicle and second location data associated with the user device;
calculating a distance between the first location data and the second location data; and
presenting the first interactive element based on the distance transgressing a predetermined threshold.

8. The method of claim 1, further comprising:
causing display, on the user device, a call option configured to dial a number for manual support in response to the second user input; and
updating the retrieval status associated with the payload in response to the call option being selected.

9. The method of claim 1, further comprising causing the vehicle to depart from the destination and execute a subsequent transportation service in response to receiving the second user interaction.

10. A computing device comprising:
a processor; and
a memory storing instructions that, when executed by the processor, configure the computing device to perform operations comprising:
causing display of a first interactive element on a user device in response to vehicle carrying a payload approaching a destination;
receiving a first user input comprising a first user interaction with the first interactive element;
in response to receiving the first user input, causing a vehicle management component communicatively coupled to the vehicle to enable access to the payload in the vehicle and causing display of a second interactive element on the user device;

receiving a second user input from the user device, the second user input comprising a second user interaction with the second interactive element;

determining a retrieval status associated with the payload based on the second user interaction;

sending a signal to the vehicle management component in response to the second user interaction, the signal comprising the retrieval status and a request to verify the retrieval status;

receiving a verified retrieval status associated with the payload;

generating a confirmation based on the verified retrieval status;

causing display of a confirmation on the user device based on retrieval status, the confirmation indicating that the payload has been retrieved; and causing the vehicle to autonomously navigate to a subsequent destination.

11. The computing device of claim 10, wherein the instructions further configure the computing device to perform the operations comprising:

matching the vehicle with a subsequent transportation service based on the retrieval status; and wherein the signal further comprises information of the subsequent transportation service.

12. The computing device of claim 10, the instructions further configure the computing device to perform the operations comprising:

receiving a vehicle status from the vehicle management component, the vehicle status indicating that the vehicle is ready for a subsequent transportation service; and matching the vehicle with the subsequent transportation service based on the vehicle status.

13. The computing device of claim 12, wherein the instructions further configure the computing device to perform the operations comprising:

determining a readiness, by the vehicle management component, based on the vehicle status of the vehicle, the vehicle status comprising a battery level.

14. The computing device of claim 12, wherein the instructions further configure the computing device to perform the operations comprising:

changing a matching priority associated with the vehicle, the matching priority determining a rate at which the vehicle is matched with a subsequent transportation service.

15. The computing device of claim 10, wherein the instructions further configure the computing device to perform the operations comprising:

causing display, on the user device, a third interactive element in response to receiving the second user input; and causing display, on the user device, the first interactive element and the second interactive element in response to receiving a third user input comprises a third user interaction with the third interactive element.

16. The computing device of claim 10, wherein the instructions further configure the computing device to perform the operations comprising:

receiving first location data associated with the vehicle and second location data associated with the user device;

calculating a distance between the first location data and the second location data; and presenting the first interactive element based on the distance transgressing a predetermined threshold.

17. The computing device of claim 10, wherein the instructions further configure the computing device to perform the operations comprising:

causing display, on the user device, a call option configured to dial a number for manual support in response to the second user input; and updating the retrieval status associated with the payload in response to the call option being selected.

18. A non-transitory computer-readable storage medium, the non-transitory computer-readable storage medium including instructions that when executed by a computing device, cause the computing device to perform operations comprising:

causing display of a first interactive element on a user device in response to vehicle carrying a payload approaching a destination;

receiving a first user input comprising a first user interaction with the first interactive element;

in response to receiving the first user input, causing a vehicle management component communicatively coupled to the vehicle to enable access to the payload in the vehicle and causing display of a second interactive element on the user device;

receiving a second user input from the user device, the second user input comprising a second user interaction with the second interactive element;

determining a retrieval status associated with the payload based on the second user interaction;

sending a signal to the vehicle management component in response to the second user interaction, the signal comprising the retrieval status and a request to verify the retrieval status;

receiving a verified retrieval status associated with the payload;

generating a confirmation based on the verified retrieval status;

causing display of a confirmation on the user device based on retrieval status, the confirmation indicating that the payload has been retrieved; and causing the vehicle to autonomously navigate to a subsequent destination.

* * * * *